US012768948B2

(12) United States Patent
Lee et al.

(10) Patent No.: US 12,768,948 B2
(45) Date of Patent: Oct. 20, 2026

(54) STATE ESTIMATION APPARATUS AND METHOD TO ESTIMATE CURRENT STATE OF OBJECT

(71) Applicant: KOREA UNIVERSITY RESEARCH AND BUSINESS FOUNDATION, Seoul (KR)

(72) Inventors: Nam Yoon Lee, Seoul (KR); Geon Choi, Seoul (KR)

(73) Assignee: KOREA UNIVERSITY RESEARCH AND BUSINESS FOUNDATION, Seoul (KR)

(*) Notice: Subject to any disclaimer, the term of this patent is extended or adjusted under 35 U.S.C. 154(b) by 240 days.

(21) Appl. No.: 18/595,578

(22) Filed: Mar. 5, 2024

(65) Prior Publication Data

US 2024/0402299 A1 Dec. 5, 2024

(30) Foreign Application Priority Data

Jun. 1, 2023 (KR) ........................ 10-2023-0070904

(51) Int. Cl.
*G01S 7/41* (2006.01)
*G01S 13/06* (2006.01)

(52) U.S. Cl.
CPC .............. *G01S 7/417* (2013.01); *G01S 13/06* (2013.01)

(58) Field of Classification Search
CPC .......... G01S 7/417; G06N 3/02; G06N 3/045; G06N 3/088; G06N 3/047; G06N 3/09; G06F 17/16
See application file for complete search history.

(56) References Cited

FOREIGN PATENT DOCUMENTS

| | | | |
|---|---|---|---|
| JP | 6689659 | B2 | 4/2020 |
| KR | 10-2016-0110773 | A | 9/2016 |

(Continued)

OTHER PUBLICATIONS

Choi et al. (Choi, G. et al. (Oct. 18, 2022). Split-KalmanNet: a robust model-based deep learning approach for SLAM. ArXiv. https://doi.org/10.48550/arXiv.2210.09636) (Year: 2022).*

(Continued)

*Primary Examiner* — Vladimir Magloire
*Assistant Examiner* — Anna K. Gosling
(74) *Attorney, Agent, or Firm* — Hauptman Ham, LLP

(57) ABSTRACT

The present disclosure provides a state estimation apparatus of estimating a current state of an object based on state information and observation information for dynamically replicating the object, the state estimation apparatus including an input unit that receives the observation information, and a current state estimation unit that generates current state estimation information through the observation information, wherein the current state estimation unit includes a prediction information generation unit that generates state prediction information through inputting past state estimation information obtained by delaying the current state estimation information by one time unit into a previously prepared state prediction model, and a prediction information correction unit that calculates a Kalman gain matrix associated with a degree of correction of the state prediction information through artificial neural network(s), and corrects the state prediction information through the observation information and the Kalman gain matrix to generate the current state estimation information.

8 Claims, 5 Drawing Sheets

(56) References Cited

FOREIGN PATENT DOCUMENTS

| | | | |
|---|---|---|---|
| KR | 10-1829560 | B1 | 2/2018 |
| KR | 10-2022-0065240 | A | 5/2022 |

OTHER PUBLICATIONS

Revach et al. (Revach, G. et al. (Mar. 11, 2022). KalmanNet: neural network aided Kalman filtering for partially known dynamics. ArXiv. https://doi.org/10.48550/arXiv.2107.10043) (Year: 2022).*

Choi et al., "Split-KalmanNet: A Robust Model-Based Deep Learning Approach for SLAM," arXiv:2210.09636v1 [eess.SP], Oct. 18, 2022 (6 pages).

* cited by examiner

STATE ESTIMATION APPARATUS AND METHOD TO ESTIMATE CURRENT STATE OF OBJECT

CROSS-REFERENCE TO RELATED APPLICATIONS

The present application claims the benefit of priority to Korean Patent Application No. 10-2023-0070904 filed on Jun. 1, 2023, in the Korean Intellectual Property Office. The aforementioned application is hereby incorporated by reference in its entirety.

BACKGROUND OF THE INVENTION

Field of the Invention

The present disclosure relates to state estimation of an object, and more particularly, to a method and apparatus of estimating a current state of an object based on state information and observation information for dynamically replicating the object.

Background of the Related Art

The problem of state estimation through a noisy observation in a dynamic system having states is an important field in signal processing technology. Problems such as target tracking through radar, surrounding environment detection for an autonomous driving system, relative position measurement of a driving object, and simultaneous localization and mapping (SLAM) of a robot may be modeled as state estimation problems in the dynamic system. Here, a Kalman filter is a representative algorithm for recursive state estimation in a linear dynamic system with additive white gaussian noise (AWGN). The Kalman filter estimates a state by repeating state prediction using information of the dynamic system and prediction correction through a noisy observation. For recursive state estimation of a general dynamical system, a variation of Kalman filter, including an extended Kalman filter for a nonlinear dynamical system, has been proposed.

In addition, a recursive state estimation algorithm using a KalmanNet that uses model-based deep learning has been proposed as a method for reducing state estimation performance degradation due to model mismatch. The KalmanNet performs state estimation by replacing a Kalman gain matrix calculation, which is affected by model mismatch, with an artificial neural network (deep neural network (DNN)) during a calculation process of the Kalman filter. This approach may achieve the state estimation performance of the Kalman filter without model mismatch through a smaller-scale neural network and a smaller number of data than when the artificial neural network is trained through data-only learning, which is a conventional deep learning method.

However, the KalmanNet learns the effects of state change noise, observation noise, and nonlinear noise that affect the Kalman gain matrix all at once without separating them. Therefore, the KalmanNet has difficulty in learning an accurate Kalman gain matrix because it cannot separate the effects of noise and the effects of nonlinearity in a dynamic system having a large nonlinearity.

In order to solve the foregoing problems, the development of an algorithm that can learn an accurate Kalman gain matrix even in nonlinear dynamic systems is required.

CITATION LIST

Patent Literature (Patent Document 1) Korean Patent Registration No. 10-18295600000

SUMMARY OF THE INVENTION

An aspect of the present disclosure is contrived to solve the foregoing problems, and an aspect of the present disclosure is to provide an apparatus and method of estimating a current state of an object.

In addition, an aspect of the present disclosure is to provide a state estimation apparatus to which a deep learning-based Split-KalmanNet structure of separating and training the effect of a source of noise on a Kalman gain matrix is applied, and a method therefor.

In order to achieve the foregoing objectives, there is provided a state estimation apparatus of estimating a current state of an object based on state information and observation information for dynamically replicating the object according to an embodiment of the present disclosure, the state estimation apparatus including an input unit that receives the observation information, and a current state estimation unit that generates current state estimation information through the observation information, wherein the current state estimation unit includes a prediction information generation unit that generates state prediction information through inputting past state estimation information obtained by delaying the current state estimation information by one time unit into a previously prepared state prediction model, and a prediction information correction unit that calculates a Kalman gain matrix associated with a degree of correction of the state prediction information through at least one artificial neural network, and corrects the state prediction information through the observation information and the Kalman gain matrix to generate the current state estimation information.

In order to achieve the foregoing objectives, there is provided a state estimation method of estimating a current state of an object based on state information and observation information for dynamically replicating the object according to an embodiment of the present disclosure, the state estimation method including a process of receiving the observation information, and a process of generating current state estimation through the observation information, wherein the process of generating the current state estimation information includes a process of generating state prediction information through inputting past state estimation information obtained by delaying the current state estimation information of the object by one time unit into a previously prepared state prediction model, and a process of calculating a Kalman gain matrix associated with a degree of correction of the state prediction information through at least one artificial neural network, and correcting the state prediction information through the observation information and the Kalman gain matrix to generate the current state estimation information.

According to an aspect of the present disclosure as described above, the present disclosure provides a state estimation apparatus to which a Split-KalmanNet structure through model-based deep learning is applied, and a method therefor, thereby having an effect of providing state estimation performance that is more robust to model mismatch compared to a KalmanNet.

In addition, in a process of learning elements constituting a Kalman gain matrix affected by model mismatch, noise from a noise source that is dominantly affected by the elements is independently considered, thereby obtaining an advantage of providing better state estimation performance compared to a KalmanNet method in a system having a large difference in a noise level from a noise source or having a large nonlinearity.

DESCRIPTION OF SYMBOLS

Figure 1:
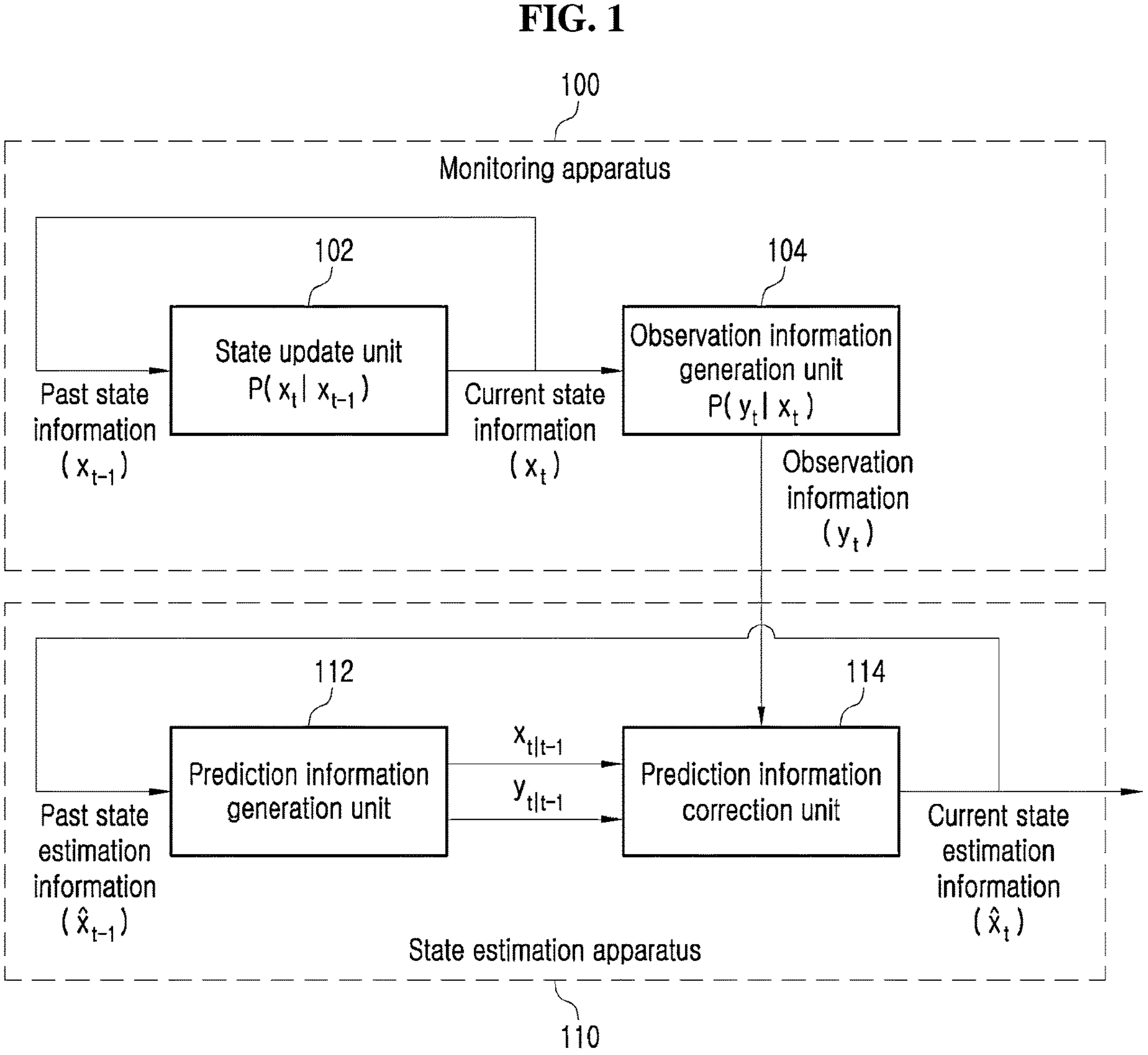
FIG. 1 is a diagram showing a system of estimating a current state of an object according to an embodiment of the present disclosure.

114-1: Kalman gain matrix calculation unit
114-2: State estimation information calculation unit

DETAILED DESCRIPTION OF THE PREFERRED EMBODIMENT

The detailed description of the present disclosure described below refers to the accompanying drawings, which show, by way of illustration, specific embodiments to carry out the present disclosure. These embodiments are described in sufficient detail to enable those skilled in the art to carry out the present disclosure. It should be understood that various embodiments of the present disclosure are different from one another but are not necessarily mutually exclusive. For example, specific shapes, structures and characteristics described herein may be implemented in other embodiments without departing from the concept and scope of the present disclosure in connection with one embodiment. In addition, it should be understood that the locations or arrangement of individual elements within each disclosed embodiment may be changed without departing from the concept and scope of the present disclosure. Therefore, the following detailed description is not to be taken in a limiting sense, and the scope of the present disclosure is defined only by the appended claims along with the entire scope of equivalents thereof, if properly described. The similar reference numerals refer to the same or similar functions in various aspects.

Elements according to the present disclosure may be elements that are defined not by physical properties but by functional properties, and thus each element may be defined by its function. Each element may be implemented as hardware and/or a program code and a processing unit for performing a function thereof, and functions of two or more elements may also be included and implemented in a single element. Accordingly, it should be noted that names of elements in embodiments to be described below are given to imply representative functions performed by each of the elements rather than to physically distinguish each of the elements, and the technical spirit of the present disclosure is not limited by the names of the elements.

Hereinafter, preferred embodiments of the present disclosure will be described in more detail with reference to the drawings.

FIG. 1 is a diagram showing a system of estimating a current state of an object drawing, to an embodiment of the present disclosure.

Referring to FIG. 1, it is assumed a system including a monitoring apparatus 100 that monitors state information of an object to generate observation information, and a state estimation apparatus 110 that modifies prediction information on the state and observation of the object with the observation information to estimate a current state of the object. Furthermore, although not shown, it is assumed that the state estimation apparatus 110 is configured with an input unit that receives observation information from the monitoring apparatus 100 and a current state estimation unit that generates current state estimation information of the object. In at least one embodiment, at least one of the monitoring apparatus 100 or the state estimation apparatus 110 comprises at least one processor or CPU configured to perform one or more functions of one or more units as described herein.

Here, the object may be, for example, a target object tracked through radar, a driving object for autonomous driving, a mobile robot, or the like, and the system shown in FIG. 1 may be applied, for example, to a target tracking system through radar, a surrounding environment detection system for autonomous driving and relative position measurement of a driving object, an SLAM system of a robot, or the like. In at least one embodiment, the current state estimation information of the object output by the state estimation apparatus 110 is used, e.g., by a processor or a controller, to perform, or cause a machine to perform, an operation in the real world with respect to the object. Examples of such operation include, but are not limited to, controlling the object, controlling a machine to interact with or track the object, or the like. For example, when the object is tracked through a radar, the generated current state estimation information is used to control or move (e.g., rotate) the radar to follow movement of the object. For another example, when the object is an autonomous vehicle or robot, the generated current state estimation information is used to control autonomous driving of the vehicle or to control movement or operation of the robot. The described operations are examples. Other operations are within the scopes of various embodiments.

The monitoring apparatus 100 includes a state update unit 102 and an observation information generation unit 104, and the current state estimation unit of the state estimation apparatus 110 includes a prediction information generation unit 112 and a prediction information correction unit 114.

The state update unit 102 receives past (time t−1) state information $x_{t-1}$ of an object to output current (time t) state information $x_t$. Here, the current state information of the object $x_t$ may be determined decisively by the past state information or determined randomly by a specific probability density function $P(x_t|x_{t+1})$.

The observation information generation unit 104 receives the current state information $x_t$ of the object to output observation information $y_t$ observed in a current state. Here, the observation information $y_t$ may be determined decisively depending on the current state or determined randomly by a specific probability density function $P(y_t|x_t)$. In this manner, the monitoring apparatus 100 acquires state information and observation information, and dynamically replicates an object based on the state information and the observation information.

The prediction information generation unit 112 receives past state estimation information $\hat{x}_{t-1}$ obtained by delaying the current state estimation information by one time unit to output current state prediction information $\hat{x}_{t|t-1}$ and observation prediction information $y_{t|t-1}$. The current state prediction information is information predicting a current state based on the past state estimation information, and the observation prediction information is information observed in the predicted current state.

The prediction information correction unit 114 receives current state prediction information $x_{t|t-1}$ and observation prediction information $y_{t|t-1}$ that are output from the prediction information generation unit 112, and observation information $y_t$ output from the observation information generation unit 104 to output current state estimation information $\hat{x}_t$ of the object.

In this manner, the state estimation apparatus 110 estimates a current state of an object through correcting state prediction information predicted by itself using observation information generated by the monitoring apparatus 100. Hereinafter, the state estimation apparatus 110 will be described in more detail with reference to FIG. 2.

Figure 2:
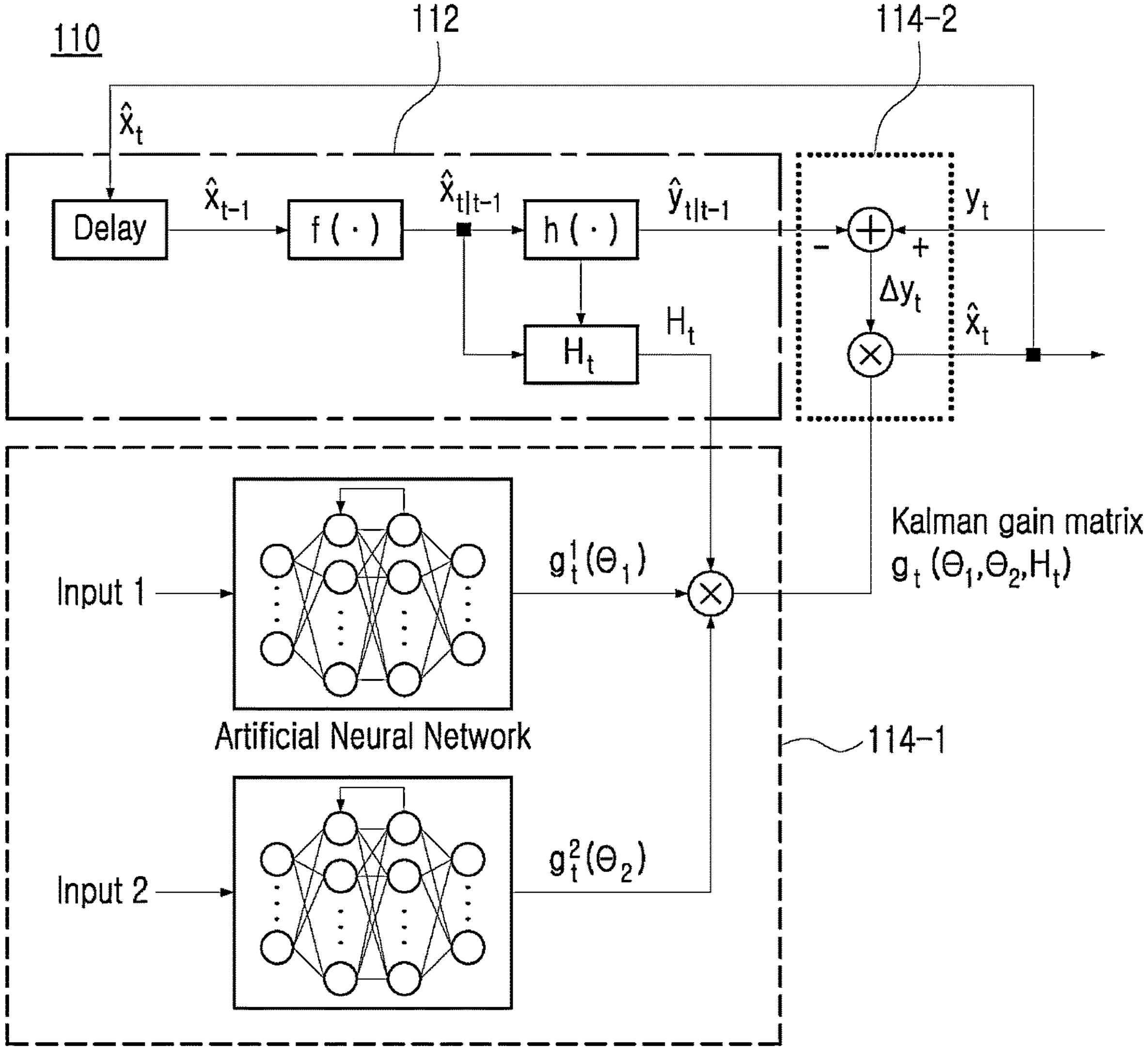
FIG. 2 is an apparatus diagram showing internal blocks of a state estimation apparatus according to an embodiment of the present disclosure.

FIG. 2 is an apparatus diagram showing internal blocks of a state estimation apparatus according to an embodiment of the present disclosure.

Referring to FIG. 2, the state estimation apparatus 110 shown herein may include a prediction information generation unit 112, a Kalman gain matrix calculation unit 114-1, and a state estimation information calculation unit 114-2, and may be designed by applying a Split-KalmanNet structure. The Kalman gain matrix calculation unit 114-1 and the state estimation information calculation unit 114-2 are detailed components included in the prediction information correction unit 114 of FIG. 1.

The prediction information generation unit 112 generates state prediction information of an object using a state prediction model, and generates observation prediction information using an observation prediction model. Equation 1 below represents a state prediction model, and Equation 2 below represents an observation prediction model.

$$\hat{x}_{t|t-1} = f(x_{t-1}) \quad \text{[Equation 1]}$$

$$y_{t|t-1} = h(x_t) \quad \text{[Equation 2]}$$

Functions $f(\cdot)$ and $h(\cdot)$ in Equations 1 and 2 may be determined as a differentiable function, and may be determined by prior knowledge of the monitoring apparatus 100 of FIG. 1. For example, assuming that a probability density function $P(x_t|x_{t-1})$ that describes the randomness of a state change and a probability density function $P(y_t|x_t)$ that describes the randomness of an observation value are given by normal distributions $\mathcal{N}(\bar{f}(x_{t-1}),Q)$ and $\mathcal{N}(\bar{g}(x_t),R)$, respectively, a state prediction model function $f(\cdot)$ and an observation prediction model function $h(\cdot)$ may be defined as $f=\bar{f}$ and $h=\bar{h}$, respectively. As a prediction function of a Split-KalmanNet, a function that calculates an average value corresponding to a first moment of the probability density function may be used.

In addition, the prediction information generation unit 112 calculates a Jacobian matrix, $H_t$ of the observation prediction model function $h(\cdot)$, which is a matrix necessary for calculating a Kalman gain matrix. The Jacobian matrix is given by Equation 3 below.

$$H_t = \frac{\partial h}{\partial x}\bigg|_{x=\hat{x}_{t|t-1}} \quad \text{[Equation 3]}$$

The Jacobian matrix $H_t$ according to Equation 3 is a matrix in which a derivative function of the observation prediction model function $h(\cdot)$ is evaluated in the current state prediction information $\hat{x}_{t|t-1}$.

The state estimation information calculation unit 114-2 modifies the state prediction information $\hat{x}_{t|t-1}$ calculated by the prediction information generation unit 112 according to Equation 4 below.

$$\hat{x}_t = \hat{x}_{t|t-1} + \mathcal{G}_t(\Theta_1, \Theta_2, H_t)(y_t - \hat{y}_{t|t-1}) \quad \text{[Equation 4]}$$

That is, in order to obtain a current state estimation information $\hat{x}_t$ of an object, the state prediction information $\hat{x}_{t|t-1}$ acquired from the prediction information generation unit 112 is corrected by using a vector obtained by multiplying a vector corresponding to a difference between the observation information $y_t$ acquired from the monitoring apparatus 100 of FIG. 1 and the observation prediction information $\hat{y}_{t|t-1}$ acquired from the prediction information generation unit 112 by the Kalman gain matrix $\mathcal{G}_t(\Theta_1,\Theta_2, H_t)$ from acquired the Kalman gain matrix calculation unit 114-1. Here, the Kalman gain matrix is associated with a degree of correction of the state prediction information.

Meanwhile, the Kalman gain matrix calculation unit 114-1 may calculate a Kalman gain matrix using a covariance matrix corresponding to a second moment of the probability density functions $P(x_t|x_{t-1})$ and $P(y_t/x_t)$. However, the covariance matrix of the probability density function depends not only on noise generated in a process of updating a state of the monitoring apparatus 100 and generating observation information, but also on the state and model mismatch between observation prediction model functions $f(\cdot)$ and $h(\cdot)$ and thus it is difficult to accurately know the covariance matrix, and an inaccurate covariance matrix deteriorates the state estimation performance of the state estimation apparatus 110.

Accordingly, the Kalman gain matrix calculation unit 114-1 according to an embodiment of the present disclosure acquired the Kalman gain matrix using an artificial neural network. The Kalman gain matrix calculation unit 114-1 calculates a Kalman gain matrix using a Jacobian matrix $H_t$ acquired from two artificial neural networks and the prediction information generation unit 112.

In particular, the Kalman gain matrix calculation unit 114-1 calculates a Kalman gain matrix through output values of two artificial neural networks trained to separate the effects of a mismatch between the state prediction model and the observation prediction model, noise in the state prediction information acquired from the state prediction model, and noise in the observation prediction information acquired from the observation prediction model. That is, the Kalman gain matrix is calculated as a product of a Jacobian matrix of the observation prediction model and two different matrices, which are output values of at least two artificial neural networks. In particular, assuming that the output values of the two artificial neural networks constituting the Kalman gain matrix calculation unit 114-1 are $$\mathcal{G}_t^1(\Theta_1)$$

and $$\mathcal{G}_t^2(\Theta_2)$$

the Kalman gain matrix is calculated as shown in Equation 5 below. Here, $\Theta_1$ and $\Theta_2$ represent parameter values of the two artificial neural networks.

$$\mathcal{G}_t(\Theta_1, \Theta_2, H_t) = \mathcal{G}_t^1(\Theta_1)H_t^\top \mathcal{G}_t^2(\Theta_2) \quad \text{[Equation 5]}$$

As can be seen from Equation 5, in an embodiment of the present disclosure, the elements of the Kalman gain matrix may be trained using artificial separate neural networks, thereby providing, through this structure, compared to the KalmanNet, which learns the Kalman gain matrix at once, better state estimation performance in a system having a large difference in a noise level from a noise source or having a large nonlinearity.

In order to assist in understanding a method of calculating a Kalman gain matrix in a Split-KalmanNet according to an embodiment of the present disclosure, an architecture of calculating a Kalman gain matrix in a Kalman filter will be described as follows. A Kalman gain matrix $K_t$ in a general Kalman filter is calculated by Equation 6 to Equation 8 below.

$$K_t = \sum\nolimits_{t|t-1} H_t^\top S_t^{-1} \quad \text{[Equation 6]}$$

$$\sum\nolimits_{t|t-1} = \mathbb{E}\left[(x_t - \hat{x}_{t|t-1})(x_t - \hat{x}_{t|t-1})^\top\right] \quad \text{[Equation 7]}$$

$$S_t = \mathbb{E}\left[(y_t - \hat{y}_{t|t-1})(y_t - \hat{y}_{t|t-1})^\top\right] \quad \text{[Equation 8]}$$

The calculation of $\Sigma_{t|t-1}$ in Equation 7 requires a covariance matrix of a probability density function $P(x_t|x_{t-1})$ that describes the randomness of a state change, and the calculation of $S_t$ in Equation 8 requires a covariance matrix of a probability density function $P(y_t|x_t)$ that describes the randomness of observation information. Accordingly, the Split-KalmanNet according to an embodiment of the present disclosure replaces it with an artificial neural network. In addition, as can be seen in Equation 5, the Split-KalmanNet maintains an architecture that combines the elements of the Kalman gain matrix in the Kalman filter through matrix multiplication to directly reflect the effect of each covariance matrix.

The artificial neural network constituting the Kalman gain matrix calculation unit 114-1 may use, for example, a recurrent neural network (RNN), and may use various other architectures. A recurrent neural network has a capability of remembering past information input into the neural network through an internal state of the neural network. The matrices $\Sigma_{t|t-1}$ and $S_t$ used to calculate the Kalman gain matrix may be interpreted as a state at a specific time t, and this state changes at each discrete time according to Equation 9 to Equation 11 below.

$$\sum\nolimits_{t|t} = (I - K_t H_t)\sum\nolimits_{t|t-1} \quad \text{[Equation 9]}$$

$$\sum\nolimits_{t|t-1} = F_t \sum\nolimits_{t-1|t-1} F_t^\top + Q \quad \text{[Equation 10]}$$

$$S_t = H_t \sum\nolimits_{t|t-1} H_t^\top + R \quad \text{[Equation 11]}$$

Here, and R represent the covariance matrices of probability density functions $P(x_t/x_{t-1})$ and $P(y_t|x_t)$, respectively. Furthermore, F represents a matrix in which a derivative function of the state prediction model $f(\cdot)$ is evaluated at $\hat{x}x_{t-1}$, which is a past estimation state. Therefore, in an embodiment of the present disclosure, a recurrent neural network having an artificial neural network as an internal state is used.

The selection of an input for an artificial neural network is important because it must include information necessary for learning an output value of the artificial neural network. The optimal input is selected in consideration of the following characteristics 1) to 3), and the Split-KalmanNet using the selected input shows good state inference performance.

1) Model mismatch between state prediction model $f(\cdot)$ and observation prediction model $h(\cdot)$
2) Noise in status information and noise in observation information
3) Local curvatures of state prediction model $f(\cdot)$ and observation prediction model $h(\cdot)$ As an example, inputs in consideration of characteristic 1) are $\hat{x}_t - x_{t-1}$ and $\tilde{y}_t = y_t - y_{t-1}$. That is, a vector corresponding to a difference between current state estimation information and past state estimation information of an object becomes an artificial neural network input 1 of the Kalman gain matrix calculation unit 114-1, and a vector corresponding to a difference between current observation information and past observation information of the object becomes an artificial neural network input 2 of the Kalman gain matrix calculation unit 114-1.

As an example, inputs in consideration of characteristic 2) are $\hat{x}_t - \hat{x}_{t|t-1}$ and $y_t - \hat{y}_{t|t-1}$. That is, a vector corresponding to a difference between current state estimation information and current state prediction information of an object becomes an artificial neural network input 1 of the Kalman gain matrix calculation unit 114-1, and a vector corresponding to a difference of current observation information and current observation prediction information of the object becomes an artificial neural network input 2 of the Kalman gain matrix calculation unit 114-1.

As an example, inputs in consideration of characteristic 3) are $h(\hat{x}_{t|t-1}) - H_t\hat{x}_{t|t-1}$ and $H_t$. That is, a vector corresponding to a difference between a value of the current state prediction information input to the observation prediction model and a product of the Jacobian matrix and the current state prediction information becomes an artificial neural network input 1 of the Kalman gain matrix calculation unit 114-1, and the Jacobian matrix becomes an artificial neural network input 2 of the Kalman gain matrix calculation unit 114-1.

Additionally, learning data and a loss function are required to train an artificial neural network. For artificial neural network learning data, for example, the observation information of an object and state estimation information closest to the state information of the object are used in the case of supervised learning, and observation prediction information acquired through the observation information of the object and observation prediction information acquired through the observation prediction model are used in the case of unsupervised learning.

In addition, in the case of supervised learning, a loss function is defined as a mean square error reflecting a difference between the state estimation information of an object and state estimation information closest to the state information of the object acquired from learning data, and supervised learning is performed in a direction of minimizing the defined loss function.

In the case of unsupervised learning, a loss function is defined as a mean square error reflecting a difference between observation prediction information acquired through the observation prediction model and the observation information of an object, and unsupervised learning is performed in a direction of minimizing the defined loss function.

Learning data $\mathcal{D}=\{(\mathbf{X}^{(\ell)},\mathbf{Y}^{(\ell)})\}_{\ell=1}^{L}$ consists of a path of L state values/observation values. The $\ell$-th path consists of $T_\ell$ data samples $(\mathbf{X}^{(\ell)},\mathbf{Y}^{(\ell)})$. Here, each data sample consists of $\mathbf{X}^{(\ell)}=[\mathbf{x}_1^{(\ell)}, \mathbf{x}_2^{(\ell)}, \ldots \mathbf{x}_{T_\ell}^{(\ell)}]$ and $\mathbf{X}^{(\ell)}=[\mathbf{x}_1^{(\ell)}, \mathbf{x}_2^{(\ell)}, \ldots, \mathbf{x}_{T_\ell}^{(\ell)}]$. Using this, an empirical loss function may be defined as shown in Equation 12 below. The loss function defined in Equation 12 is defined as an example, and the form of the loss function may be defined appropriately depending on an environment in which the Split-KalmanNet is used.

$$\mathcal{L}(\Theta_1, \Theta_2) = \frac{1}{L}\sum_{\ell=1}^{L}\frac{1}{T_\ell}\sum_{t=1}^{T_\ell}\left\|x_t^{(\ell)} - \hat{x}_{t|t}\left(y_t^{(\ell)}; \mathcal{G}_t(\Theta_1, \Theta_2, H_t)\right)\right\|_2^2. \quad \text{[Equation 12]}$$

Using the learning data and the empirical loss function, the parameters $\Theta_1$ and $\Theta_2$ of the artificial neural network may be optimized in a direction of minimizing Equation 12. To this end, the loss function of Equation 12 may be differentiated with respect to artificial neural network parameters using chain rules of Equations 13 and 14, and differential values of Equation 15.

$$\frac{\partial\mathcal{L}(\Theta_1, \overline{\Theta}_2)}{\partial\Theta_1} = \frac{\partial\mathcal{L}(\Theta_1, \overline{\Theta}_2)}{\partial\mathcal{G}_t(\Theta_1, \overline{\Theta}_2, H_t)}\frac{\partial\mathcal{G}_t^1(\Theta_1)}{\partial\Theta_1}H_t\mathcal{G}_t^2(\overline{\Theta}_2) \quad \text{[Equation 13]}$$

$$\frac{\partial\mathcal{L}(\overline{\Theta}_1, \Theta_2)}{\partial\Theta_2} = \frac{\partial\mathcal{L}(\overline{\Theta}_1, \Theta_2)}{\partial\mathcal{G}_t(\overline{\Theta}_1, \Theta_2, H_t)}\mathcal{G}_t^1(\overline{\Theta}_1)H_t\frac{\partial\mathcal{G}_t^2(\Theta_2)}{\partial\Theta_2} \quad \text{[Equation 14]}$$

$$\frac{\partial\mathcal{L}(\Theta_1, \Theta_2)}{\partial\mathcal{G}_t(\Theta_1, \Theta_2, H_t)} = \frac{1}{LT_\ell}\sum_{\ell=1}^{L}\sum_{t=1}^{T_\ell}\frac{\partial\left\|\Delta x_t^{(\ell)} - \mathcal{G}_t(\Theta_1, \Theta_2, H_t)\Delta y_t^{(\ell)}\right\|_2^2}{\partial\mathcal{G}_t(\Theta_1, \Theta_2, H_t)} = \frac{2}{LT_\ell}\sum_{\ell=1}^{L}\sum_{t=1}^{T_\ell}\left(\mathcal{G}_t(\Theta_1, \Theta_2, H_t)\Delta y_t^{(\ell)} - \Delta x_t^{(\ell)}\right)\left(\Delta y_t^{(\ell)}\right)^\top \quad \text{[Equation 15]}$$

Here, $\Delta \mathbf{x}_t^{(\ell)} = \mathbf{x}_t^{(\ell)} - \hat{\mathbf{x}}_{t|t-1}^{(\ell)}$, and $\Delta \mathbf{y}_t^{(\ell)} = \mathbf{y}_t^{(\ell)} - \hat{\mathbf{y}}_{t|t-1}^{(\ell)}$.

In order to optimize parameters using the differential values, an algorithm such as stochastic gradient descent (SGD) may be used. In addition, an optimization method that repeats a process of fixing a parameter $\Theta_2$ and applying stochastic gradient descent in a direction of making Equation 13 equal to zero, then fixing a parameter $\Theta_1$ and applying stochastic gradient descent in a direction of making Equation 14 equal to zero may be used.

First, the state change and observation data of a linear uniform circular motion system are given according to Equations 16 and 17 below.

$$x_{t+1} = \begin{bmatrix}\cos\theta & -\sin\theta\\ \sin\theta & \cos\theta\end{bmatrix}x_t + w_t \quad \text{[Equation 16]}$$

$$y_t = x_t + v_t \quad \text{[Equation 17]}$$

Here, $w_t$ and $v_t$ represent probability vectors that follow multivariate normal distribution probability density functions $\mathcal{N}(0,10^{-3}I)$ and $\mathcal{N}(0,10^{-3}\nu I)$ respectively. In addition, θ represents a rotation angle according to discrete time in units of radians, and is assumed to be a value known in advance by the state estimation algorithm. ν represents a variable introduced to control a state change and a level of noise in observation data.

Figure 3:
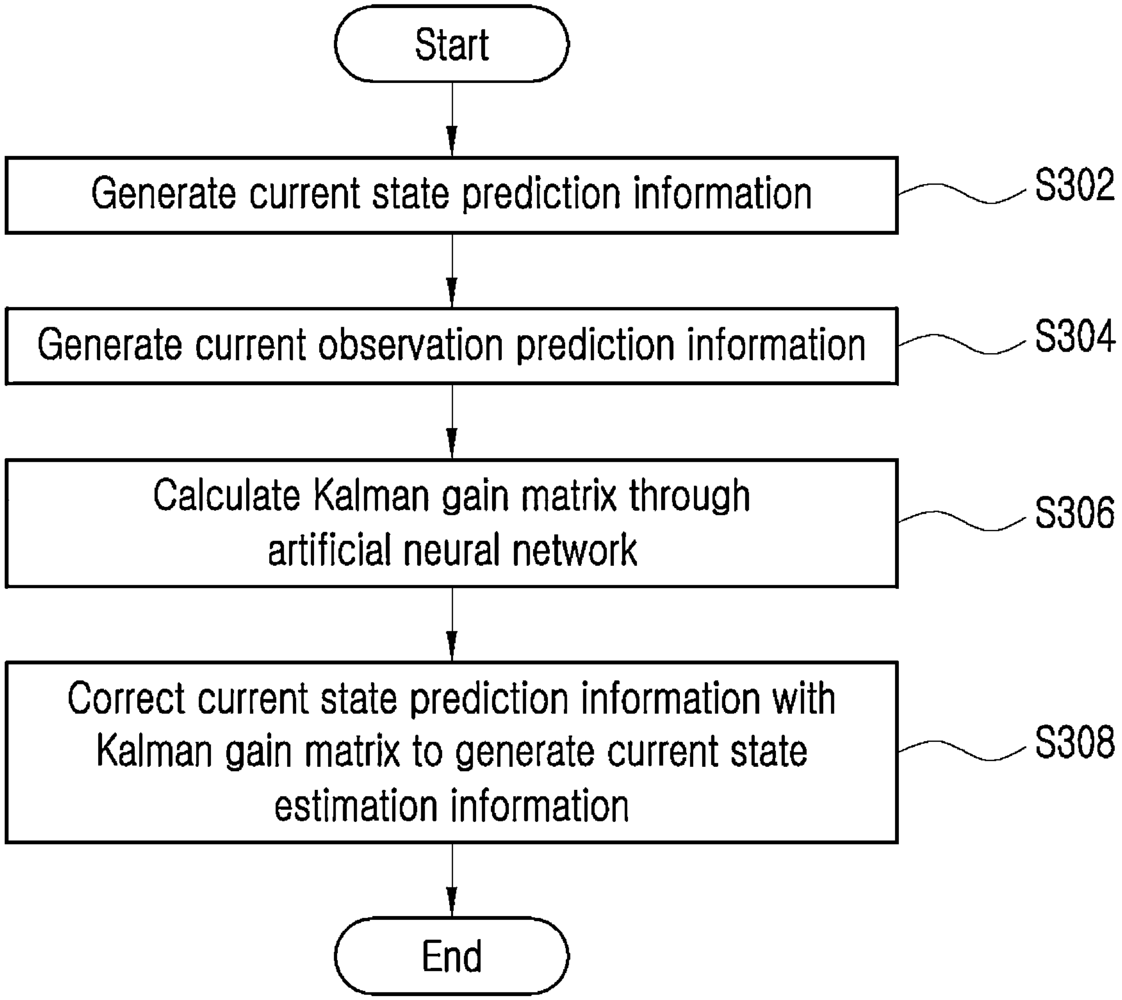
FIG. 3 is a flowchart showing an operation of a state estimation apparatus according to an embodiment of the present disclosure.

FIG. 3 is a flowchart showing an operation of a state estimation apparatus according to an embodiment of the present disclosure.

Referring to FIG. 3, in S302, the state estimation apparatus generates current state prediction information through receiving past state estimation information obtained by delaying the current state estimation information of an object by one time unit into a previously prepared state prediction model and proceeds to S304.

In S304, the state estimation apparatus receives the current state prediction information generated in S302 into the previously prepared observation prediction model to generate current observation prediction information and proceeds to S306.

In S306, the state estimation apparatus calculates a Kalman gain matrix associated with a degree of correction of the state prediction information through at least one artificial neural network and proceeds to S308.

In S308, the state estimation apparatus corrects the current state prediction information generated in S302 with the Kalman gain matrix calculated in S306 to generate current state estimation information of the object.

Figure 4:
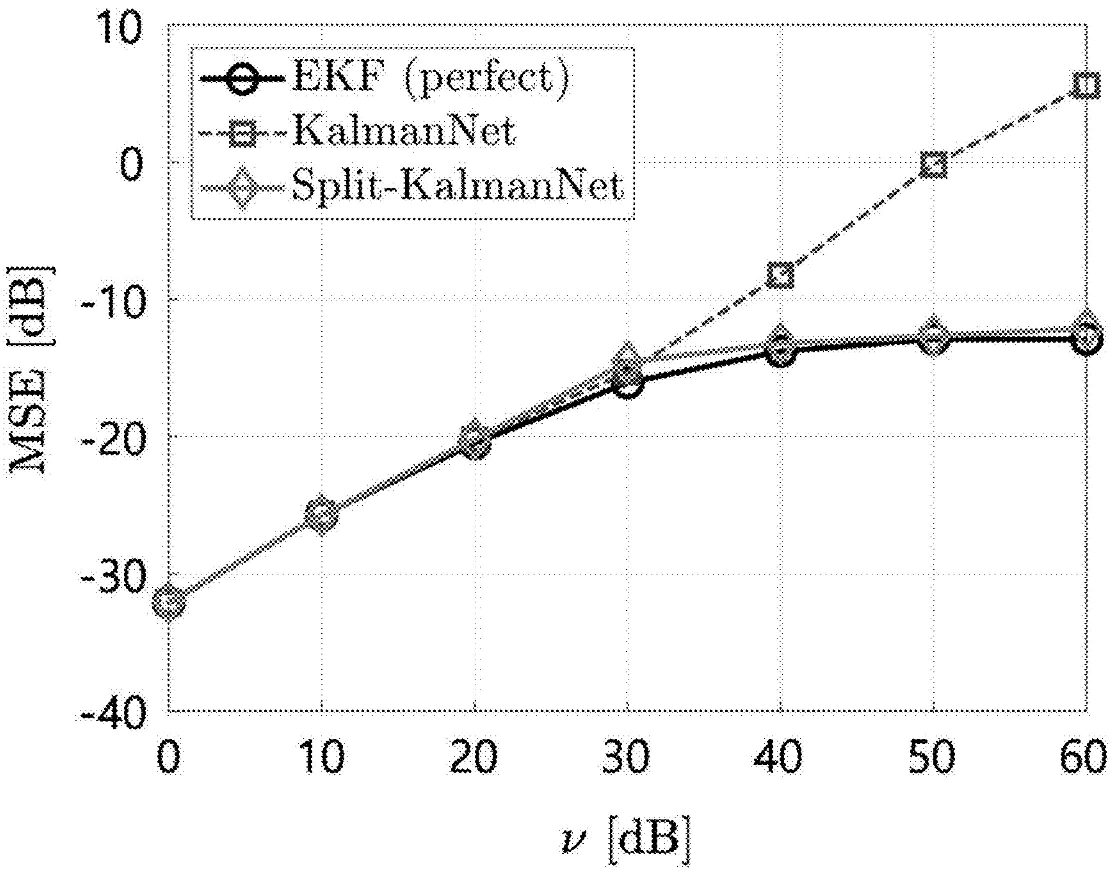
FIG. 4 is a graph in which the state estimation accuracy of a Split-KalmanNet according to an embodiment of the present disclosure is compared with the state estimation accuracies of an extended Kalman filter, and a KalmanNet for a uniform circular motion system through a linear observation.

FIG. 4 is a graph in which the state estimation accuracy of a Split-KalmanNet according to an embodiment of the present disclosure is compared with the state estimation accuracies of an extended Kalman filter, and a KalmanNet for a uniform circular motion system through a linear observation.

Referring to FIG. 4, there is shown a graph in which an extended Kalman filter (EKF) of an algorithm that theoretically calculates a minimum mean square error (MMSE) when there is no model mismatch, and a mean square error (MSE) according to a change of ν in a KalmanNet that removes the effect of model mismatch through data are compared with a mean square error (MSE) of a Split- KalmanNet according to an embodiment of the present disclosure. Here, ν represents a state change and a degree of noise in observation data.

When the effects of two noises are similar, that is, when ν is small, it can be seen that all algorithms perform state estimation that produces the minimum mean square error. However, it can be seen that when noise in observation data increases, that is, when ν is large, the Split-KalmanNet according to an embodiment of the present disclosure performs state estimation that produces the minimum mean square error without using information on a covariance matrix of the noise, but this is not the case with the extended Kalman filter and the KalmanNet.

Figure 5:
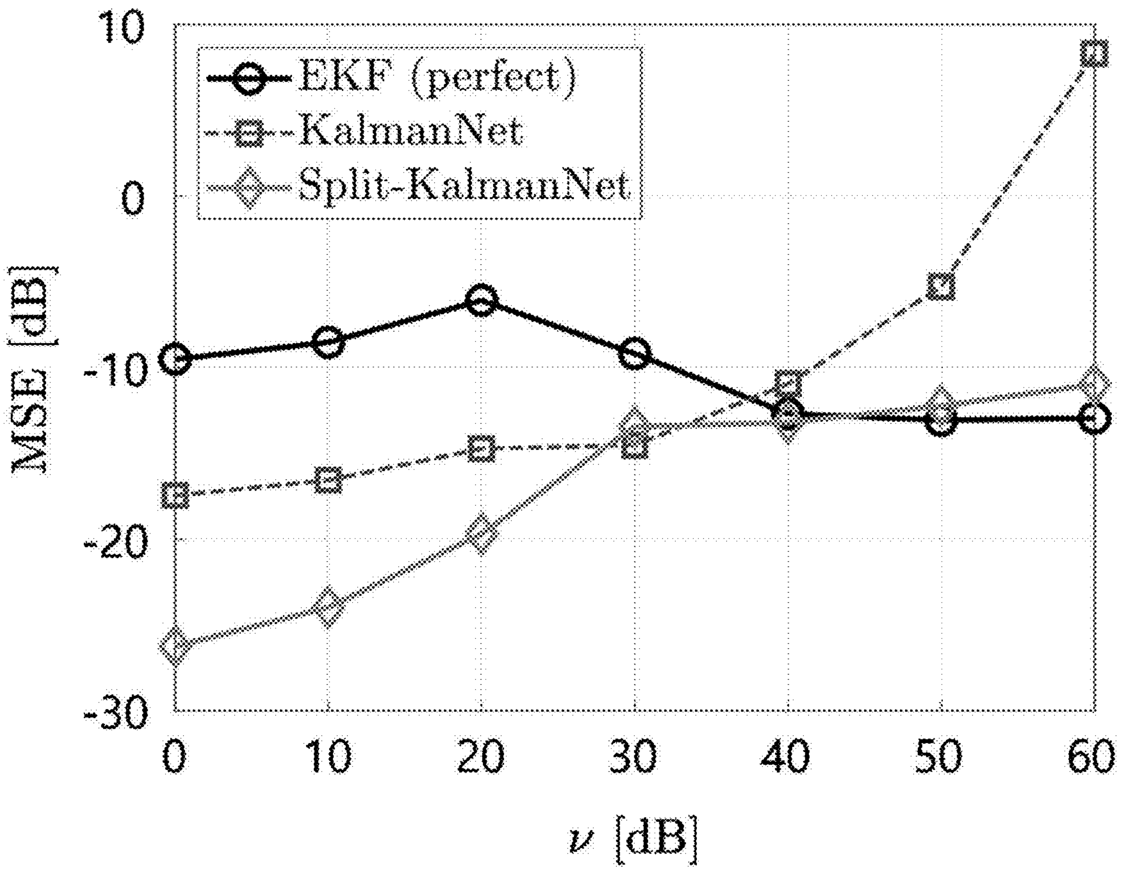
FIG. 5 is a graph in which the state estimation accuracy of a Split-KalmanNet according to an embodiment of the present disclosure is compared with the state estimation accuracies of an extended Kalman filter. and a KalmanNet for a uniform circular motion system through a nonlinear observation.

FIG. 5 is a graph in which the state estimation accuracy of a Split-KalmanNet according to an embodiment of the present disclosure is compared with the state estimation accuracies of an extended Kalman filter, and a KalmanNet for a uniform circular motion system through a nonlinear observation.

Referring to FIG. 5, the state change and observation data of a uniform circular motion system through a nonlinear observation are given according to Equations 18 and 19 below, respectively.

$$x_{t+1} = \begin{bmatrix} \cos\theta & -\sin\theta \\ \sin\theta & \cos\theta \end{bmatrix} x_t + w_t \quad \text{[Equation 18]}$$

$$y_t = \left[\|x_t\|_2^2 \operatorname{atan2}(x_t)\right]^\top + v_t \quad \text{[Equation 19]}$$

Here, a tan 2(·) represents a function that outputs an angle between an x-axis and a state vector in radians on a Euclidean plane. Furthermore, $w_t$ and $v_t$ represent probability vectors that follow multivariate normal distribution probability density functions $\mathcal{N}(0,10^{-3}I)$ and $\mathcal{N}(0,10^{-3}\nu I)$, respectively. In addition, θ represents a rotation angle according to discrete time in units of radians, and is assumed to be known in advance by the state estimation algorithm. ν represents a variable introduced to control a state change and a level of noise in observation data.

In FIGS. 4 and 5, in order to check the effect of a Split-KalmanNet according to an embodiment of the present disclosure, the MSEs of an extended Kalman filter and a KalmanNet in a general state estimation algorithm are compared with the MSE of a Split-KalmanNet on a ν axis.

Given nonlinear observational data, when the extended Kalman filter can no longer estimate a state with a minimum mean square error, particularly when the effects of two noises are similar, that is, when ν is small, it can be seen that the KalmanNet and the Split-KalmanNet exceed the state estimation performance of the extended Kalman filter that accurately uses a covariance matrix of the noise. In particular, the Split-KalmanNet shows superior state estimation performance than the KalmanNet, which is due to the fact that the Split-KalmanNet, unlike the KalmanNet, additionally considers information in the local form of an observation model through a Jacobian matrix and a linearization error when calculating a Kalman gain matrix.

When noise in the observation data increases, that is, when ν is large, the KalmanNet fails to learn a Kalman gain matrix as in the case of a linear data observation, but the Split-KalmanNet according to an embodiment of the present disclosure shows state estimation performance that is close to that of an extended Kalman filter that accurately uses a covariance matrix of noise. Through this, it can be seen that the Split-KalmanNet according to an embodiment of the present disclosure more effectively handles the effects of noise due to various noise sources compared to general algorithms.

The method of estimating a current state of an object proposed in the present disclosure may be implemented in the form of program instructions that can be executed through various computer elements, e.g., a processor or central processing unit (CPU, and recorded on a computer-readable recording medium. The computer-readable recording medium may include program instructions, data files, data structures, and the like separately or in combination.

The program instructions stored on the computer-readable recording medium may be specially designed and configured for the present disclosure, or may also be known and available to those skilled in the computer software field.

Examples of the computer-readable recording medium include magnetic media such as hard disks, floppy disks, and magnetic tapes, optical media such as compact disk-read only memory (CD-ROM) and digital versatile disks (DVDs), magneto-optical media such as floptical disks, and hardware devices such as read-only memory (ROM), random access memory (RAM), and flash memory, which are specially configured to store and execute program instructions.

Examples of the program instructions include not only machine language codes created by a compiler or the like, but also high-level language codes that can be executed by a computer using an interpreter or the like. The hardware devices may be configured to operate as one or more software modules in order to perform the operation of the present disclosure, and vice versa.

While various embodiments of the present disclosure have been shown and described above, it will be of course understood by those skilled in the art that various modifications may be made without departing from the gist of the disclosure as defined in the following claims, and it is to be noted that those modifications should not be understood individually from the technical concept and prospect of the present disclosure.

What is claimed is:

1. A state estimation apparatus of estimating a current state of an object based on state information and observation information for dynamically replicating the object, the state estimation apparatus comprising:

a current state estimation unit configured to generate current state estimation information based on the observation information, wherein the current state estimation unit comprises:

a prediction information generation unit configured to delay the current state estimation information obtained at a previous time point by one time unit to obtain past state estimation information, and input the past state estimation information into a previously prepared state prediction model to obtain state prediction information; and a prediction information correction unit configured to calculate a Kalman gain matrix associated with a degree of correction of the state prediction information, and correct the state prediction information based on the observation information and the Kalman gain matrix to generate the current state estimation information;

wherein the prediction information generation unit is further configured to generate observation prediction information by inputting the state prediction information into a previously prepared observation prediction model; and wherein the prediction information correction unit is configured to calculate the Kalman gain matrix based on output values of a plurality of different artificial neural networks trained to separate effects of a mismatch between the state prediction model and the observation prediction model, noise in the state prediction information, and noise in the observation prediction information.

2. The state estimation apparatus of claim 1, wherein the prediction information correction unit is configured to calculate the Kalman gain matrix as a product of a Jacobian matrix of the observation prediction model and the output values of the plurality of artificial neural networks.

3. The state estimation apparatus of claim 2, wherein the plurality of artificial neural networks is configured to receive: a vector corresponding to a difference between the current state estimation information and the past state estimation information and a vector corresponding to a difference between the observation information and the observation prediction information in consideration of a mismatch between the state prediction model and the observation prediction model; or a vector corresponding to a difference between the current state estimation information and the state prediction information and a vector corresponding to a difference between the observation information and the observation prediction information in consideration of noise in the state information and noise in the observation information; or a vector corresponding to a difference between a value of the state prediction information input to the observation prediction model and a product of the Jacobian matrix and the state prediction information and a vector of the Jacobian matrix in consideration of a local curvature of the state prediction model and the observation prediction model.

4. The state estimation apparatus of claim 2, wherein the plurality of artificial neural networks comprises at least one of: a first artificial neural network configured to use the observation information and state estimation information closest to the state information as learning data in supervised learning, or a second artificial neural network configured to use the observation information and the observation prediction information as learning data in unsupervised learning.

5. A state estimation method of estimating a current state of an object based on state information and observation information for dynamically replicating the object, the state estimation method performed at least in part by a processor and comprising:

generating current state estimation information based on the observation information, by delaying the current state estimation information obtained at a previous time point by one time unit to obtain past state estimation information, inputting the past state estimation information into a previously prepared state prediction model to obtain state prediction information, generating observation prediction information by inputting the state prediction information into a previously prepared observation prediction model, calculating a Kalman gain matrix associated with a degree of correction of the state prediction information, and correcting the state prediction information based on the observation information and the Kalman gain matrix to generate the current state estimation information, wherein the Kalman gain matrix is calculated based on output values of a plurality of different artificial neural networks trained to separate effects of a mismatch between the state prediction model and the observation prediction model, noise in the state prediction information, and noise in the observation prediction information.

6. The state estimation method of claim 5, wherein the Kalman gain matrix is calculated as a product of a Jacobian matrix of the observation prediction model and the output values of the plurality of artificial neural networks.

7. The state estimation method of claim 6, wherein the plurality of artificial neural networks receive: a vector corresponding to a difference between the current state estimation information and the past state estimation information and a vector corresponding to a difference between the observation information and the observation prediction information in consideration of a mismatch between the state prediction model and the observation prediction model; or a vector corresponding to a difference between the current state estimation information and the state prediction information and a vector corresponding to a difference between the observation information and the observation prediction information in consideration of noise in the state information and noise in the observation information; or a vector corresponding to a difference between a value of the state prediction information input to the observation prediction model and a product of the Jacobian matrix and the state prediction information and a vector of the Jacobian matrix in consideration of a local curvature of the state prediction model and the observation prediction model.

8. The state estimation method of claim 6, wherein the plurality of artificial neural networks comprises at least one of: a first artificial neural network that uses the observation information and state estimation information closest to the state information as learning data in supervised learning, or a second artificial neural network that uses the observation information and the observation prediction information as learning data in unsupervised learning.

* * * * *